UNITED STATES PATENT OFFICE.

KARL JOHN SUNDSTRÖM, OF RUSTIC, NEW JERSEY, ASSIGNOR, BY MESNE ASSIGNMENTS, TO THE AMERICAN FORCITE POWDER MANUFACTURING COMPANY, OF NEW YORK, N. Y.

BLASTING-POWDER.

SPECIFICATION forming part of Letters Patent No. 370,025, dated September 13, 1887.

Application filed May 7, 1886. Serial No. 201,443. (No specimens.)

*To all whom it may concern:*

Be it known that I, KARL JOHN SUNDSTRÖM, a subject of the Crown of Sweden, residing at Rustic, in the county of Morris and State of New Jersey, have invented a new and useful Improvement in Blasting-Powder, of which the following is a specification.

Heretofore what are called "low-percentage blasting-powders" have been prepared by mixing together in a double bottomed or jacketed vessel heated by steam at a pressure of at least one hundred pounds per square inch, sulphur, soft coal, and nitrate of soda; but that method of preparation does not give a perfectly homogeneous product, and has often resulted in explosions, owing to the excessive heat employed.

The objects of this invention are to avoid all danger in the manufacture of such powder, to increase its power, and to make it more homogeneous. To attain these objects, I moisten the nitrate of soda, ground to the very finest powder, with wood-tar in which has been previously dissolved as much rosin as is possible without too much thickening the tar. I then add to this mass, in any suitable vessel, a solution of sulphur in a volatile solvent, as carbon bisulphide, and mix the whole by stirring with wooden paddles, or by the use of any other suitable mixing device or apparatus. This process is or may be performed at the temperature of 50° centigrade.

The solution of sulphur in carbon bisulphide is easily dissolved in the tar, and thus constitutes, with the nitrate of soda, a perfectly homogeneous mixture which in a few minutes becomes as hard as stone. This hardened product is ground to powder of any desirable fineness. To this powder from five to eight per cent. of nitro-glycerine may be added for making it more highly explosive; or, by adding coal of any kind to the powder, the violence of its explosiveness may be diminished to suit the various demands for a strong but slowly-exploding blasting-powder.

The proportions of the several ingredients employed in carrying out my invention may be to some extent varied without materially changing the character of my product; but I prefer to use them in the proportions, by weight, as follows: nitrate of soda, three hundred and seventy parts; wood-tar, thirty-eight parts; rosin, thirty-two parts; sulphur, fifty parts; carbon bisulphide, ten parts.

A striking advantage of my process of manufacture of the powder compound is that I get a perfectly homogeneous mixture without dangerously heating it during the preparation.

I am aware that tar and oleaginous matters have been mixed with powder for the purpose of rendering it non-explosive in the open air and from friction and concussion; and I am also aware that it is not new, broadly considered, to treat potassium nitrate with a solution of sulphur in carbon bisulphide, and hence I do not claim, broadly, the above steps in the manufacture of powder as of my invention.

The nitrate of soda which I employ rapidly absorbs moisture, and to prevent this I coat it with wood-tar and rosin to form a coating impervious to moisture. Coal-tar would not answer the purpose, because the benzole which it contains would dissolve the sulphur afterward added and destroy the homogeneity of the product. The employment of rosin prevents the stickiness due to the tar and causes the powder to run freely, which it might not do if tar alone were used. The absence of charcoal in my powder reduces its tendency to absorb moisture. The tar and rosin form a coating which is impervious to moisture, and hence the nitrate of soda is prevented from deterioration. When the sulphur solution is added to nitrate of soda so coated, the carbon bisulphide dissolves the tar and then evaporates, leaving the nitrate of soda coated or varnished with tar and sulphur, which thereafter protects the particles from moisture, and at the same time maintains an intimate combination of the sulphur and nitrate. I desire, therefore, to include in my invention the process of manufacture as a whole without reference to the novelty of the steps considered individually.

What I claim as my invention, and desire to secure by Letters Patent, is—

1. The within-described process of preparing a blasting-powder compound, consisting in moistening nitrate of soda with a solution of wood-tar and rosin, whereby a coating is formed thereon which is impervious to moisture, and adding to and mixing with the nitrate of soda so coated a solution of sulphur in a volatile solvent, whereby the tar is dissolved and an intimate combination of the sulphur and nitrate produced, substantially as herein 2. A blasting-powder mixture composed of nitrate of soda coated or impregnated with wood-tar, rosin, and sulphur, in the proportions substantially as herein set forth.

KARL JOHN SUNDSTRÖM.

Witnesses:
 MAHLON PITNEY,
 FRANK H. TIPPETT.